United States Patent Office 3,594,199
Patented July 20, 1971

3,594,199
METHOD OF MAKING IMPROVED FIRED BASIC REFRACTORY BRICK AND PRODUCT
Walter S. Treffner, Linthicum Heights, and George D. MacKenzie, Baltimore, Md., assignors to General Refractories Company, Philadelphia, Pa.
No Drawing. Filed Sept. 13, 1968, Ser. No. 759,772
Int. Cl. C04b 35/42
U.S. Cl. 106—59
22 Claims

ABSTRACT OF THE DISCLOSURE

An improved fired basic refractory brick is provided by firing a shaped body consisting essentially of an intimate mixture of, A, a pre-reacted mixture of periclase and chrome ore wherein periclase particles are sintered directly to chrome ore particles and, B, a small amount of fine, substantially pure chromic oxide ($Cr_2O_3$).

BACKGROUND OF THE INVENTION

It is known to prepare a pre-reacted basic refractory grain of periclase and chrome ore wherein periclase particles are sintered directly to chrome ore particles by firing a mixture of periclase and chrome ore, preferably in briquette form, at a temperature of at least 1700° C. (3100° F.) to cause sintering and reaction without appreciable melting, and to prepare bricks from such grain, with or without the addition of magnesia, by firing at 2800–3000° F. (See, for example, U.S. Pat. 3,180,743; Austrian Pat. 189,113 and copending U.S. application Ser. No. 663,983 filed Aug. 29, 1967, now Pat. No. 3,429,723.) The brick of said copending U.S. application has excellent properties. Outstanding among them are low porosity, good strength at room temperature, excellent bending and compressive strengths at intermediate and high temperatures, and often very good volume stability after reheat. These properties are mainly achieved by the formation of numerous direct ceramic bonds between periclase and chrome ore particles by the high-temperature sintering of the periclase and chrome bearing raw materials. These bonds are the result of high temperature interactions between the raw material constitutents which involve solid state reactions, solution-precipitation reactions and redistribution of silicate impurities. If such grains are formed into a brick and fired using conventional techniques, the direct bonding of the basic constituents is sufficiently enhanced to achieve the aforementioned desirable properties.

It is also known to add fine chrome ore to such a pre-reacted periclase-chrome ore grain in the preparation of brick (see, for example, U.S. Pat. 3,180,743 and Austrian Pat. 189,113). U.S. Pat. 2,537,013 discloses adding a solution of a soluble chromium compound to magnesia and chrome ore in making brick. Furthermore, it is known to add chromic oxide to brick-making batches containing magnesia, alumina, zirconia or chrome ore or mixtures thereof in which, however, the constituents have not been pre-reacted.

It is the principal object of the present invention to provide a further improvement in properties of brick made from the stated pre-reacted grain.

It is another principal object of the invention to provide a method for providing, from magnesia and chrome ore, basic, fired refractory brick of improved properties.

These and other objects, including the provision of basic, fired refractory bricks of improved properties, will become apparent from a consideration of the following specification and claims.

SUMMARY OF THE INVENTION

It has been found that a substantial improvement in fired properties, over those of brick prepared from the stated pre-reacted grain alone or to which fine chrome ore has been added, can be achieved if there is intimately mixed with the pre-reacted grain a small amount of very fine, relatively pure chromic oxide.

Thus, the present invention comprises, in the method of making fired, basic refractory brick wherein a shaped body of refractory grain consisting essentially of a pre-reacted mixture of periclase and chrome ore in which periclase particles are sintered directly to chrome ore particles is fired, the improvement wherein a small amount of fine, substantially pure chromic oxide is intimately mixed with said refractory grain before firing the shaped body.

It has been found, as illustrated in the specific examples hereinafter set forth, that the resulting brick has improved properties, including increased density, lower firing shrinkage, lower porosity and higher hot strength, as compared to brick made from the same material (except for the chromic oxide addition) under the same conditions.

THE PREFERRED EMBODIMENTS

In preparing the cosintered, pre-reacted mixture, magnesia, or a source of magnesia like magnesite, magnesium hydroxide, or the like, and chrome ore are mixed and, preferably, the mixture is pressed into shaped bodies, like briquettes. The mixture is then burned or fired to cause sintering and reaction without appreciable melting. For this sintering, a temperature of at least 1700° C., and preferably at least 1750° C., is used. During heating to sintering, the magnesia or source of magnesia forms periclase, as cubic crystals, and during sintering a direct ceramic bond is formed by interfacial diffusion between the periclase particles and the chrome ore particles. This bond is of a nature such that it is retained substantially during subsequent processing. Also during sintering, silicates from the periclase and chrome ore particles migrate to and accumulate in the small interstices between the particles and there is substantially no silicate layer formed between the periclase particles and chrome ore particles. Some MgO diffuses from the periclase particles into the chrome ore particles, and some iron, chromium and aluminum diffuses from the chrome ore particles into the periclase particles and into the silicate accumulations, where, upon cooling, some of these exsolve as $MgO \cdot Fe_2O_3$, $MgO \cdot Cr_2O_3$ and $MgO \cdot Al_2O_3$.

The sinter is then crushed, ground and size graded for brick making. Generally, from about 50 to about 80% thereof will be coarse grain sized, for instance —4 +48 mesh, preferably —6 +48 mesh (the mesh sizes referred to herein are Tyler) and from about 50 to about 20% will be fine grain sized, for instance —48 mesh, preferably —100 mesh. In any event, substantially all of the cosintered material used in accordance with the present invention will be —4 mesh. Advantageously, from about 40 to about 80% and preferably from about 60 to about 75% of the fine grain sized cosintered material is —325 mesh.

The sources of magnesia in preparing the sintered material include crude (raw) natural magnesite, crude flotation magnesite, magnesium hydroxide, caustic magnesia, calcined magnesite, and the like. The raw natural magnesite generally has an MgO content of at least about 83%, such as from about 83 to about 89%, and the flotation magnesite has a somewhat higher MgO content up to 92%, such as 91–92° based on an oxide analysis of deadburned material). However, the magnesia employed can even contain a higher proportion of MgO. The preferred magnesia has an MgO content between about 88 and about 92%. Raw magnesite, is, of course, in carbonate form. Lightly calcined magnesite or magnesium hydroxide or dead-burned magnesite, having the state MgO content, may also be subjected to the sintering operation. Regardless of the chemical form of the source of magnesia used as starting material, it is periclase which cosinters with the crome ore, and hence reference is made herein simply to a cosintered or pre-reacted mixture of periclase and chrome ore. The magnesia in the mixture to be cosintered will generally be fine grain sized, for instance, finer than 48 mesh and preferably finer than 100 mesh with at least 10% thereof —325 mesh.

In the production of the cosintered material, the chrome ore will generally be coarse grain sized, for instance, —4 mesh, and it is desirable that at least 65%, and preferably at least 80%, of the chrome ore have a particle size over 100 mesh.

The composition of the materials to be used for the cosintering is selected so that the sintered material has a silica content not exceeding 5.5%, preferably not exceeding 4.5%, and a lime:silica molecular ratio not exceeding 2:1, preferably not exceeding 1:1. The aforementioned maximum silica content of 5.5% in the sintered material prevents the chrome ore particles from being enveloped with silicates to that, at the burning temperature used of at least 1700° C. the obtaining of a direct bond between the chrome ore particles and the periclase particles is insured.

The cosintered material should be prepared from chrome ore having a silica content no higher than 7%, preferably less than 5%, and the magnesia source should have a lime content such that the sintered material has a lime content from 0.5 to 2.5% preferably from 0.8 to 1.5%. Both the chrome ore and the magnesia source should be used in such proportions that the sintered material contains 5 to 30% of $Cr_2O_3$.

As stated, the refractory grain used in preparing the brick according to the present invention consists essentially of the above-described cosintered, pre-reacted material. Thus, minor amounts of other materials may be included which do not materially alter the novel and advantageous properties of the brick composition. For example, to the cosintered material may be added a minor proportion of magnesia, generally not over about 30%, based on the combined weight of the magnesia and cosintered material. The magnesia, which may be from one of those sources mentioned above, will be in MgO form, that is, it will have been calcined or dead-burned prior to mixing with the cosintered material. The added magnesia will have a particle size of —4 mesh, and preferably —6 mesh.

In accordance with the present invention, there is intimately mixed with the refractory grain a small amount of very fine, substantially pure chromic oxide ($Cr_2O_3$). This material is preferably a pigment grade chromic oxide having a purity of at least 95%, and is advantageously in the area of about 98–99% purity. It is generally a precipitated material so that it has a particle size substantially all —325 mesh. The preferred material has an average particle size of about 0.6–1 micron. The amount of chromic oxide employed may range from about 2 to about 10%, by weight, based on the weight of the refractory grain. The preferred amount is from about 3 to about 6% on the stated basis.

In preparing the brick, the mix is tempered with an aqueous binder to a pressable consistency. The binder is conventional and may be, for example, sodium ligninsulfonate, or the like. The moist mixture is then pressed into a body of the desired shape and dried at a temperature of at least 212° F. and up to about 350° F. A preferred drying temperature is from about 230 to about 300° F.

The shaped body, after drying, is then fired. The firing temperature may be as low as about 2800° F., 2800–3000° F. being the conventional brick-firing range. However, substantial improvement is obtained if the brick is fired above 3000° F., particularly at a temperature of at least about 3100° F. The firing temperature may go as high as about 3800° F., although temperatures above about 3400° F. are usually unnecessary.

The maximum time at which the shaped body is held at the firing temperature is not critical, but times in excess of about 24 hours are uneconomical. According to preferred practice, the shaped body is held at the firing temperature for at least about 4 hours, and preferably from about 5 to about 10 hours. The firing cycle is preferably of a type normally encountered in a tunnel kiln. Thus, the rate at which the temperature of the shaped body is raised from atmospheric temperature to the firing temperature preferably will not exceed an average of about 200° F. per hour. Obviously the rate may be well below this and there is no critical minimum rate beyond that dictated by economic factors. An average heating rate is referred to since, initially, when the shaped body is at a relatively low temperature, the rate of temperature increase may be much higher than when it is at a relatively high temperature approaching the selected firing temperature. Likewise, the rate at which the fired shaped body is cooled from the firing temperature preferably will be such that the rate of temperature decrease to about 1000° F. will be no greater than about 300° F. per hour. Here again the cooling rate may be well below this and there is no critical minimum cooling rate beyond that dictated by economic factors. Again an average rate is referred to in the cooling portion of the cycle since, initially, when the shaped body is at a relatively high temperature at or near the firing temperature, the rate of temperature decrease will be much higher than when its temperature approaches 1000° F. One the shaped body has reached a temperature of about 1000° F. the stated cooling rate is not critical at all since deleterious changes can no longer occur below about 1000° F. regardless of the rate of cooling.

The invention will be more readily understood from a consideration of the following specific examples which are given for the purpose of illustration only and are not to be considered as limiting the scope of the invention in any way.

EXAMPLES 1–3

In these examples: a cosintered grain is provided by sintering in a rotary kiln at 1800–1900° C., briquettes of a mixture of (A) magesite analyzing (on a calcined basis) 90.9% MgO, 2.9% $SiO_2$, 3.9% $Fe_2O_3$, 0.8% $Al_2O_3$ and 1.5% CaO, and having a particle size of —48 mesh with 25% —325 mesh; and (B) chrome ore analyzing (on a dried basis) 51.0% $Cr_2O_3$, 3.6% $SiO_2$, 15.4% $Fe_2O_3$, 11.4% $Al_2O_3$, 0.4% CaO and 16.4% MgO and having a particle size of about 50% —4 +8 mesh and about 50% —8 +48 mesh. The sinter has the composition: 3.1% $SiO_2$, 9.0% $Fe_2O_3$, 6.1% $Al_2O_3$, 1.0% CaO, 56.0% MgO and 24.8% $Cr_2O_3$, and has a bulk specific gravity of 3.43. The sinter is then crushed and ground to provide a size-graded mixture of about 70% —6 +48 mesh and about 30% —100 mesh, with about 60% of the latter —325 mesh.

Three separate batch mixes are prepared as follows: (1) consisting of the cosintered grain alone; (2) consisting of the cosintered grain to which is added 5%, by weight, based on the weight of the cosintered grain, of washed fine chrome ore (86% —325 mesh); and (3) consisting of the cosintered grain to which is added 5%, by weight, based on the weight of the cosintered grain, of pigment grade chromic oxide, 98–99% pure (average particle size about 0.8 micron, Fisher).

To each of the resulting mixes is added 2.5%, by weight, of a 50% aqueous solution of sodium lignosulfonate and a small additional amount of water for tempering to a pressable consistency. The mixes are then pressed into bricks (9" x 4½" x 2½") under 12,000 p.s.i., the bricks are dried at 230° F. and then fired (burned) at 3100° F. The firing cycle involves heating the bricks from room temperature to 3100° F. at an average heating rate of 180° F./hour, holding at the firing temperature for about 5 hours and then cooling, the average cooling rate being about 80° F./hour to 2350° F. The bricks are tested and the resulting data are set forth in the following Table I (the figures being averages from a plurality of specimens of each brick mix:

TABLE I

|  | 1 | 2 | 3 |
|---|---|---|---|
| After drying: Bulk density, oz./cu. in. | 1.77 | 1.79 | 1.85 |
| After firing: |  |  |  |
| Bulk density, oz./cu. in. | 1.78 | 1.81 | 1.84 |
| Linear shrinkage, percent | 0.51 | 0.61 | 0.47 |
| Volume shrinkage, percent | 2.17 | 2.35 | 1.57 |
| Porosity, percent | 18.1 | 17.3 | 17.1 |
| Hot modulus of rupture, p.s.i.: |  |  |  |
| At 2,300° F. | 2,310 | 2,295 | 3,680 |
| At 2,500° F. | 1,365 | 1,305 | 1,960 |

EXAMPLES 4–5

In these examples, a cosintered grain is prepared as in Examples 1–3 using the same procedure and using the same magnesite and chrome ore but proportioned to provide a sinter having the composition: 3.2% $SiO_2$, 8.0% $Fe_2O_3$, 3.2% $Al_2O_3$, 1.4% CaO, 72.4% MgO and 11.8% $Cr_2O_3$, with a bulk specific gravity of 3.36.

Two mixes are made: (4) consisting of the cosintered grain alone; and (5) consisting of the cosintered grain to which is added 5%, by weight, based on the weight of the cosintered grain of the fine chromic oxide as used in Example 3.

Bricks are made from each mix as in Examples 1–3 but using a firing cycle (tunnel kiln) such that the bricks are heated from room temperature to 3100° F. at an average heating rate of about 125° F. per hour, held at 3100° F. for 6 hours, and cooled at an average cooling rate of about 125° F. per hour. The resulting properties are set forth below:

TABLE II

|  | 4 | 5 |
|---|---|---|
| After drying: Bulk density, oz./cu. in. | 1.77 | 1.81 |
| After firing: |  |  |
| Bulk density, oz./cu. in. | 1.80 | 1.84 |
| Volume shrinkage, percent | 3.4 | 2.6 |
| Cold crushing strength, p.s.i. | 4,510 | 7,130 |
| Porosity, percent | 14.4 | 12.6 |
| Hot modulus of rupture, p.s.i.: |  |  |
| At 2,300° F. | 1,260 | 1,670 |
| At 2,500° F. | 735 | 895 |
| Hot load deformations, at 3,100° F. after 5 hours, percent | 5.4+ | 3.0 |

EXAMPLES 6 AND 7

In these examples, a cosintered grain is prepared as in Examples 1–3. To the grain is added 15%, by weight, of unreacted calcined magnesite of —6 mesh.

Two mixes are then made: (6) consisting of the mixture of cosintered grain and magnesite; and (7) consisting of the mixture of cosintered grain and magnesite to which is added 5% of the fine chromic oxide as used in Example 3.

Bricks are made from each mix as in Examples 1–3 using a firing cycle (tunnel film) in which the bricks are heated to 3000° F. at an average heating rate of about 125° F. per hour, held at 3000° F. for 5 hours and cooled at an average cooling rate of about 125° F. per hour. The resulting properties are set forth below:

TABLE III

|  | 6 | 7 |
|---|---|---|
| After drying: Bulk density, oz./cu. in. | 1.76 | 1.87 |
| After firing: |  |  |
| Bulk density, oz./cu. in. | 1.75 | 1.86 |
| Linear shrinkage, percent | 0.04 | 0.19 |
| Volume shrinkage, percent | 1.44 | 1.18 |
| Porosity, percent | 18.8 | 15.6 |
| Hot modulus of rupture, p.s.i.: |  |  |
| At 2,300° F. | 700 | 2,700+ |
| At 2,700° F. | 115 | 845 |

Modification is possible in the selection of materials and in the particular techniques and conditions employed without departing from the scope of the invention.

What is claimed is:

1. In the method of making fired, basic refractory brick wherein a shaped body of refractory grain consisting essentially of a pre-reacted mixture of periclase and chrome ore in which periclase particles are sintered directly to chrome ore particles, is fired, the improvement wherein fine, substantially pure chromic oxide, in an amount from about 2 to about 10%, by weight, based on the weight of the refractory grain, is intimately mixed with said refractory grain before firing the shaped body.

2. The method of claim 1 wherein said chromic oxide is in an amount from about 3 to about 6%, by weight, based on the weight of said refractory grain.

3. The method of claim 1 wherein said chromic oxide has a purity of at least 95%.

4. The method of claim 3 wherein said chromic oxide has a purity of about 98–99%.

5. The method of claim 1 wherein said chromic oxide is substantially all —325 mesh.

6. The method of claim 5 wherein said chromic oxide has an average particle size of about 0.6–1 micron.

7. The method of claim 1 wherein said chromic oxide has a purity of at least 95% and is substantially all —325 mesh.

8. The method of claim 2 wherein said chromic oxide has a purity of at least 95% and is substantially all —325 mesh.

9. The method of claim 1 wherein said chromic oxide has a purity of about 98–99% and has an average particle size of about 0.6–1 micron.

10. The method of claim 1 wherein said brick are fired at a temperature above 3000° F.

11. The method of claim 10 wherein said brick are fired at a temperature of from about 3100° F. to about 3400° F.

12. The method of claim 1 wherein said pre-reacted mixture consists essentially of a cosintered mixture of relatively fine periclase and relatively coarse chrome ore.

13. The method of claim 12 wherein the pre-reacted mixture consists essentially of a cosintered mixture of —48 mesh particles of which at least about 10% is —325 mesh, and —4 mesh chrome ore.

14. The method of claim 12 wherein the pre-reacted mixture consists essentially of a cosintered mixture of —48 mesh periclase and —4 mesh chrome ore of which at least about 65% of said chrome ore has a particle size over 100 mesh.

15. The method of claim 14 wherein at least about 80% of said chrome ore has a particle size over 100 mesh.

16. The method of claim 12 wherein the pre-reacted mixture consists essentially of a cosintered mixture of —100 mesh particles, of which at least about 10% is —325 mesh, and —4 mesh chrome ore of which at least about 65% of said chrome ore has a particle size over 100 mesh.

17. The method of claim 1 wherein the relative proportions of said periclase and chrome ore in said pre-reacted mixture provide a $Cr_2O_3$ content therein of from about 5 to about 30%.

18. The method of claim 1 wherein said pre-reacted mixture has a silica content no greater than 5.5%.

19. The method of claim 1 wherein said pre-reacted mixture has a particle size distribution of between about 50 and about 80% relatively coarse grain sized and between about 50 and about 20% relatively fine grain sized.

20. The method of claim 1 wherein said pre-reacted mixture consists essentially of a cosintered mixture of —48 mesh periclase, of which at least about 10% is —325 mesh, and —4 mesh chrome ore of which at least 65% has a particle size over 100 mesh; wherein the relative proportions of said periclase and said chrome ore in said pre-reacted mixture provide a $Cr_2O_3$ content therein of from about 5 to about 30%; wherein said pre-reacted mixture has a silica content no greater than 5.5%; wherein said pre-reacted mixture has a particle size distribution of between about 50 and about 80% relatively coarse grain sized and between about 50 and about 20% relatively fine grain sized, and wherein said chromic oxide is in an amount from about 2 to about 10%, by weight, based on the weight of said refractory grain.

21. A fired, basic refractory brick made from a mixture consisting essentially of a pre-reacted mixture of periclase and chrome ore in which periclase particles are sintered directly to chrome ore particles and fine, substantially pure chromic oxide in an amount from about 2 to about 10%, by weight, based on the weight of said pre-reacted mixture of periclase and chrome ore.

22. The brick of claim 21 wherein said chromic oxide is in an amount from about 3 to about 6% and has a purity of at least 95% and a particle size substantially all through —325 mesh.

References Cited

UNITED STATES PATENTS

| | | | |
|---|---|---|---|
| 3,192,058 | 6/1965 | Davies et al. | 106—59 |
| 3,258,353 | 6/1966 | Heuer | 106—59 |
| 3,312,457 | 4/1967 | Schweinberg et al. | 106—59 |

JAMES E. POER, Primary Examiner